(12) United States Patent
MacDonald

(10) Patent No.: US 6,571,719 B2
(45) Date of Patent: Jun. 3, 2003

(54) HORIZONTAL SEAM BOXCAR SIDE WALL

(75) Inventor: Glenn MacDonald, Trenton (CA)

(73) Assignee: Trentonworks Limited, Trenton (CA)

( * ) Notice: Subject to any disclaimer, the term of this patent is extended or adjusted under 35 U.S.C. 154(b) by 0 days.

(21) Appl. No.: 09/928,877

(22) Filed: Aug. 13, 2001

(65) Prior Publication Data

US 2002/0020325 A1 Feb. 21, 2002

(30) Foreign Application Priority Data

Aug. 16, 2000 (CA) .............................................. 2316148

(51) Int. Cl.⁷ .............................................. B61D 17/00
(52) U.S. Cl. ..................................................... 105/404
(58) Field of Search ....................... 104/396, 410, 104/401; 105/404

(56) References Cited

U.S. PATENT DOCUMENTS 2,839,013 A * 6/1958 Gunnell et al. ............. 105/369
5,702,151 A * 12/1997 Grote et al. ................. 220/1.5
5,916,093 A * 6/1999 Fecko et al. .................... 52/17
6,044,771 A * 4/2000 Nguyen ....................... 105/247

OTHER PUBLICATIONS

Canadian Pacific Railway Specification, Specification No. 2000, pp. 2 and 4, Issue Date Feb. 25, 1999, Revision Date Jun. 1, 2000.

2001–2002 Car & Locomotive Yearbook, pp. 18 and 19.

* cited by examiner

Primary Examiner—S. Joseph Morano
Assistant Examiner—Robert J. McCarry, Jr.
(74) Attorney, Agent, or Firm—John W. Ross

(57) ABSTRACT

Smooth interior walls for steel boxcars are provided by an improved fabrication technique. The boxcar side wall is constructed using a horizontal offset seam joined by welding. There are no vertical butt welds in the side assembly, which butt welds and the reinforcements associated with such welds have traditionally caused damage to sensitive cargo like newsprint rolls.

8 Claims, 4 Drawing Sheets

HORIZONTAL SEAM BOXCAR SIDE WALL

BACKGROUND OF THE INVENTION

This invention relates to steel railway boxcars and, in particular, to means for providing smooth interior walls for such boxcars.

Producers of pressure sensitive cargo such as newsprint and rolled paper for some time have been complaining about damage to cargo caused when the heavy paper rolls lean against the interior wall of a steel boxcar. Butt welds and plug welds, used to attach the side sheets to the side post, have raised reinforcement on them that damage the outer layer of the paper roll when the weight of the paper roll leans against the interior wall.

Many boxcar manufacturers are attempting to build steel boxcars in a manner that interior seams are not presented to the cargo or, if they are presented, pose no damage risk as they are smooth with the adjacent side walls.

Although progressive strides have been made in the art of applying the butt weld bead and/or grinding off the excess weld reinforcement along the vertical seam welds, the paper industry has not generally been impressed with railcar manufacturer's results. There is a great demand in the newsprint/paper industry for a "zero protrusion" or smooth interior boxcar side wall.

SUMMARY OF THE INVENTION

Accordingly, the invention in one aspect provides a steel boxcar side wall construction including a pair of wall side sheets joined together by a lap joint configuration defined by one sheet of said pair having an offset section along that edge of the sheet to be joined to the other of said sheets with the lateral offset distance (d) of said one sheet being equal to the thickness (t) of the other said sheet. The sheets are overlapped and welded together along said offset section such that inner surfaces of the two sheets thus joined lie substantially in a common plane with no or substantially no weld material lying inwardly of said common plane. This side wall construction is capable of presenting a substantially smooth interior surface to cargo being carried in a boxcar employing said side wall construction.

Further features of the invention will become apparent from the following description and the appended claims.

DETAILED DESCRIPTION OF A PREFERRED EMBODIMENT

Figure 1:
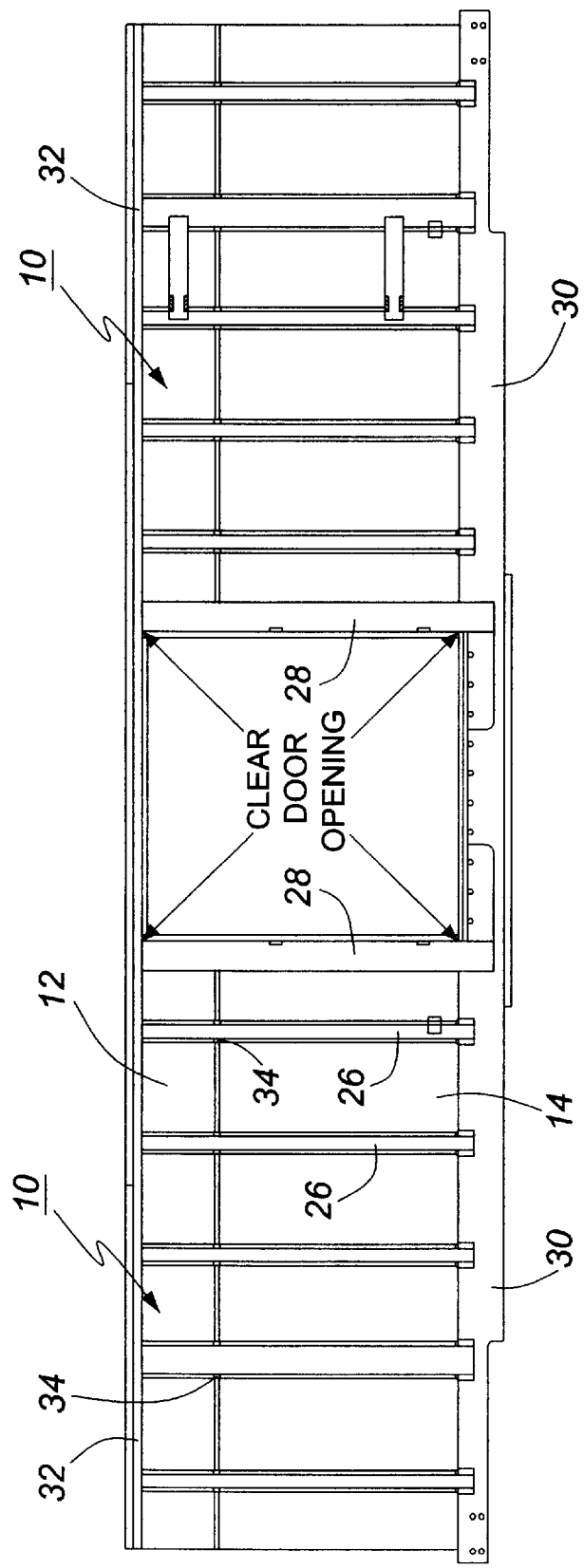
FIG. 1 is a side elevation of a boxcar side wall.
Figure 2:
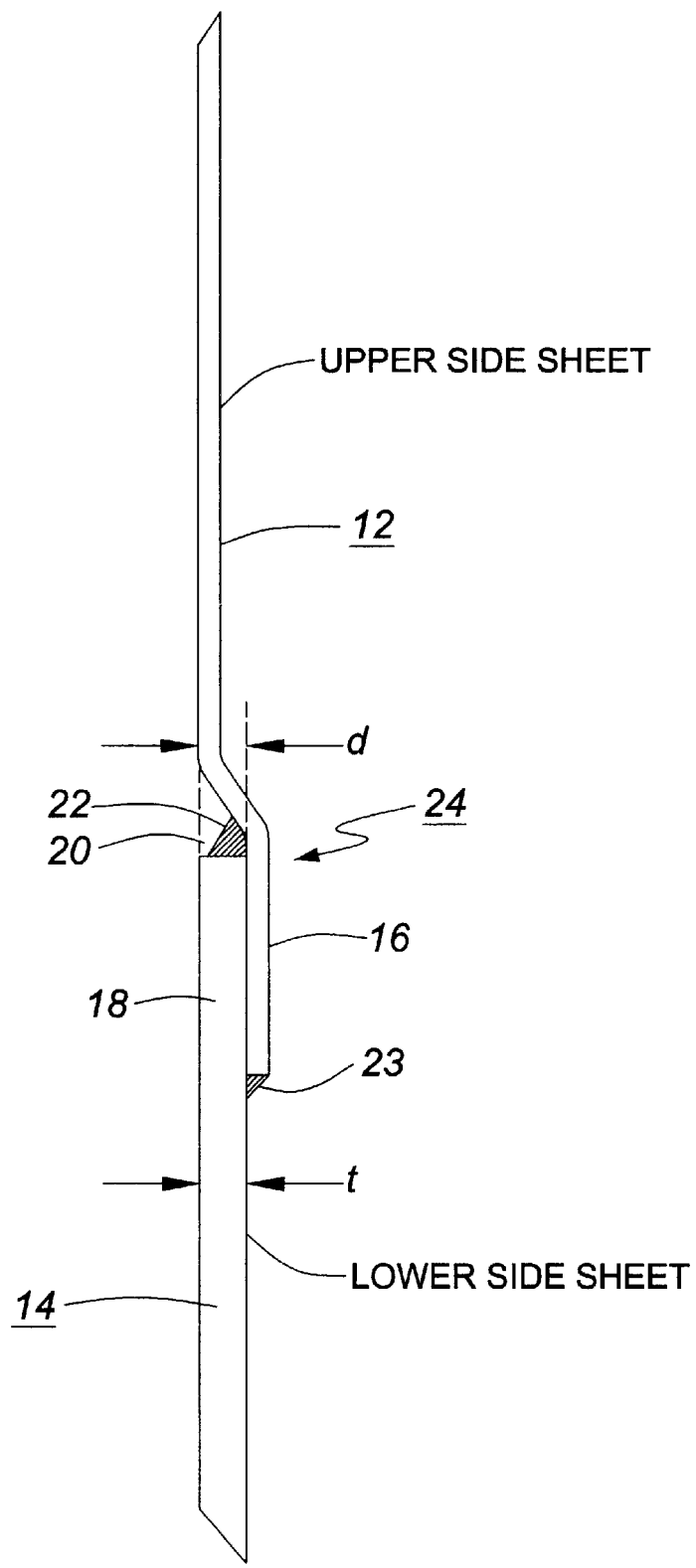
FIG. 2 is a sectional detail of the welded horizontal joint.

Referring to the drawings, a boxcar side quarter panel 10 is constructed of two sheets 12, 14. The upper side sheet 12 (FIG. 2) has an offset section 16 along its bottom edge. This offset section 16 laps the upper edge portion 18 of the lower side sheet thus creating a groove 20. This groove 20 runs horizontally (i.e. parallel to the lengthwise dimension of the boxcar) along the entire length of the quarter panel. A weld 22 is applied to this joint within the groove 20 and a fillet weld 23 is run along the outside of the lap joint 24 thus formed.

Vertical side posts 26 are spaced intermittently along the side quarter panel. These posts 26 have a special offset 34 in them that aligns with the side sheet joint. These posts 26 are attached to the side sheets by conventional vertical fillet welds.

In a typical embodiment the lower side sheet 14 is 0.197 ins. thick and upper side sheet 12 is 0.1196 ins. thick and both are rectangular in shape. These side sheets run continuously from the end sheet of the car to the door post 28. Side sheet 14 is welded to the side sill/J pressing at its bottom and is joined to the upper side sheet 12 in the lap joint configuration 24 described above and best shown in FIG. 2. Lading strap dimples are pressed or cut into the lower side sheet 14 as dictated by the customer's requirements. The lower edge portion of upper side sheet 12 is prepared with the offset section 16, the lateral offset distance (d) of which is equal to the thickness (t) of the lower side sheet 14 such that the inner flat surfaces of the upper and lower side sheets 12, 14 lie in a common plane. The lower edge of the upper side sheet 12 is welded to the outer surface of lower side sheet 14 by fillet weld 23 in the manner shown in FIG. 2. The double bend offset in the upper side sheet 12 creates the groove 20 which is located at and defined by this offset and the extreme top edge of the lower side sheet 14. The groove provides ample depth in which to build up a strong weld 22 with little risk of the weld projecting outwardly of the common plane defined by the cojoined sheets 12 and 14. Lading strap dimples are pressed or cut into the upper side sheet 12 as dictated by the customer's requirements.

Figures 3, 3A, 3B:
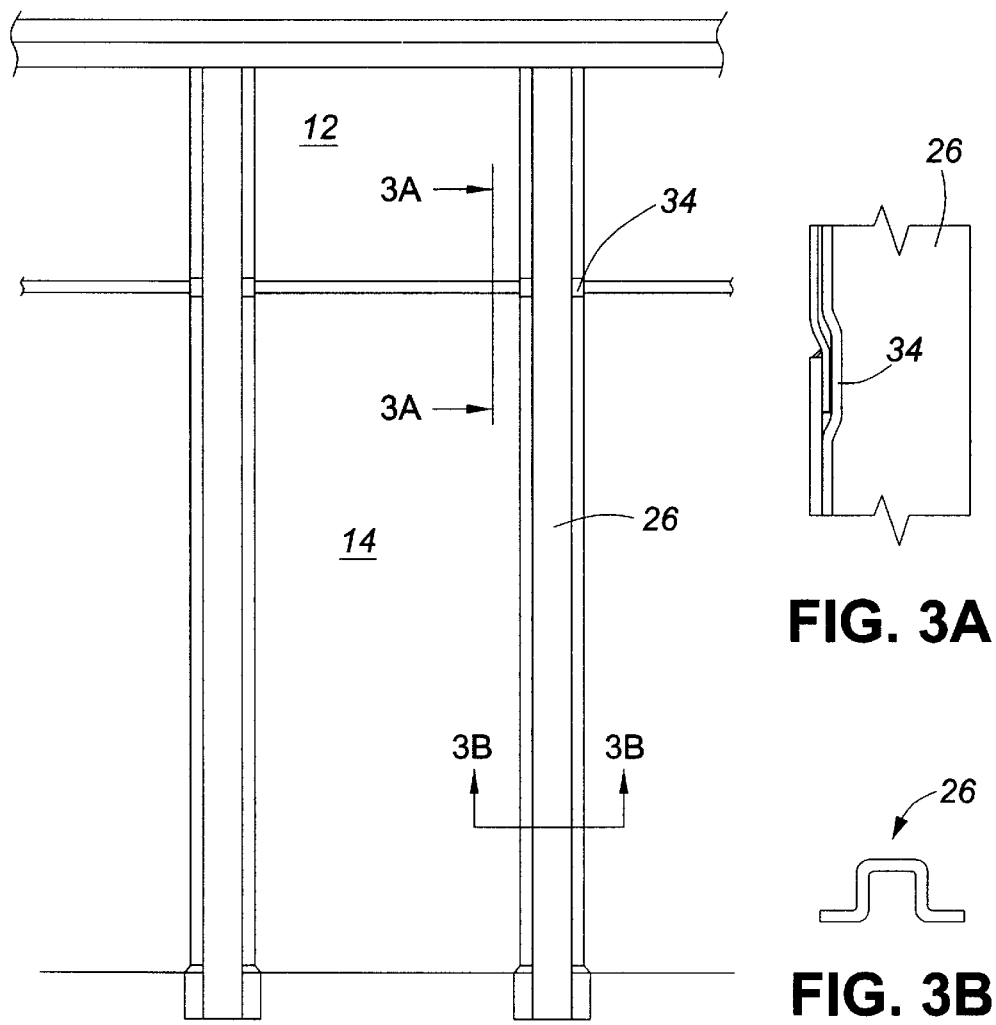
FIG. 3 is a side elevation detail including the side posts.
FIG. 3A is a sectional view taken along line 3A—3A in FIG. 3.
FIG. 3B is a sectional view taken along line 3B—3B in FIG. 3.

The side posts 26 are then welded to the side sheet assembly by vertical fillet welds. These posts 26 are made from "hat shaped" in section (FIG. 3B) pressings and they run vertically from the side sill/J pressing 30 to the top side plate 32. Each post has an offset 34 pressed into it. This offset 34 aligns with and is shaped to accommodate the horizontal lap joint 24 in the side sheet as seen in FIG. 3A.

Two quarter panels 10, thus constructed, have door posts 28, top side plate 32 and J pressing 30 applied. The two completed sides, thus constructed, are then secured to the railcar underframe.

Figure 4:
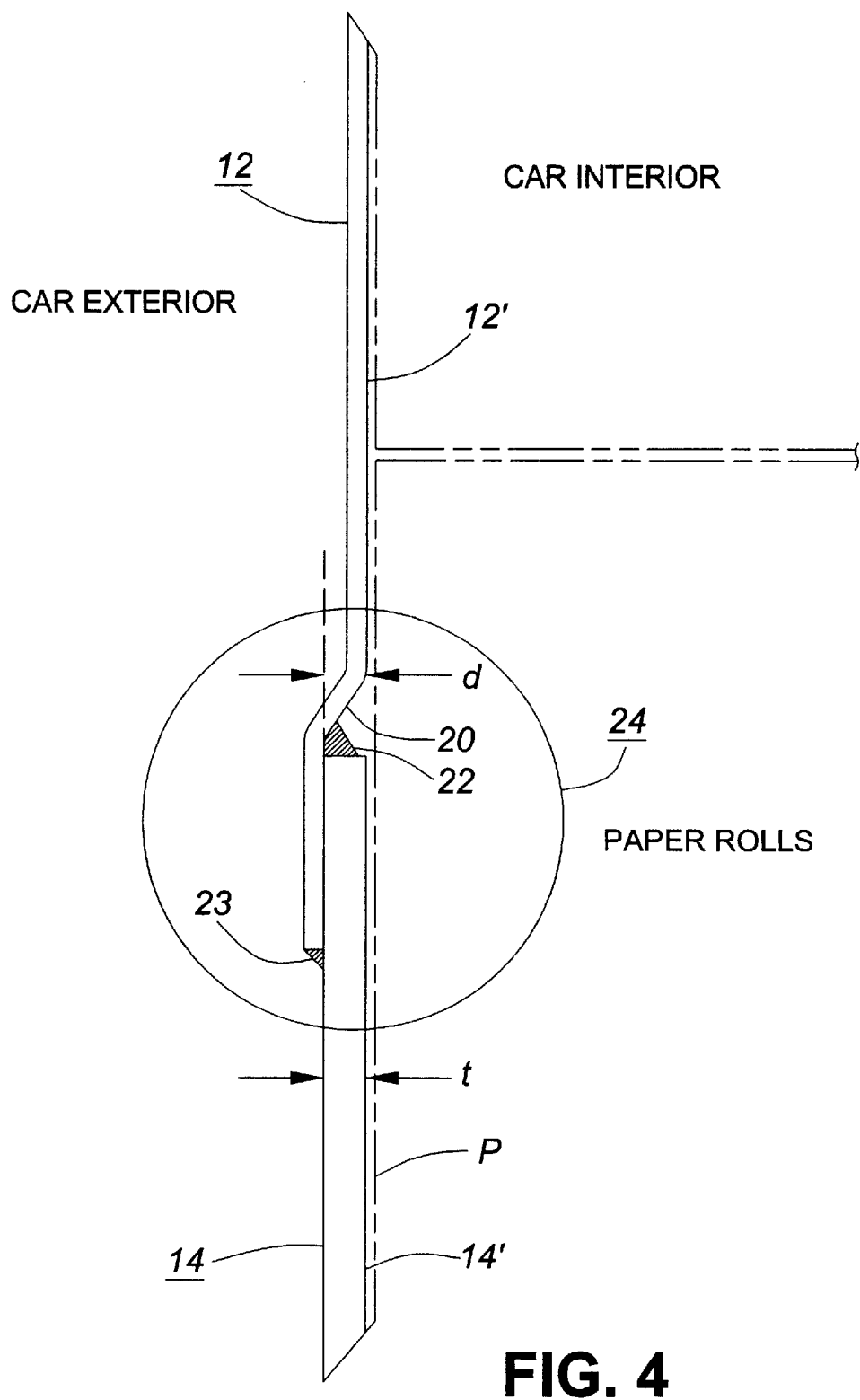
FIG. 4 is a detail in section of paper roll/side wall interface.

By virtue of this side wall construction, a truly smooth interior is presented to the paper roll lading. Thus, no damage can be inflicted to the paper rolls by raised weld seams in the car side wall due to the fact that these types of welds have been eliminated as best seen in FIG. 4. The inner surfaces 12', 14' of the upper and lower side sheets 12 and 14 respectively lie in the plane parallel to plane P shown by the dashed lines representing the ends of the paper rolls and there are no projecting welds thus presenting a substantially "zero protrusion" inner surface to the cargo being carried, in this case, paper rolls. Cargo damage during transit within the boxcar is greatly reduced as a result.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

What is claimed is:

1. A steel boxcar side wall construction including a pair of steel wall side sheets joined together by a lap joint configuration defined by one sheet of said pair having an offset section extending along that edge of the sheet to be joined to the other of said sheets wit a lateral offset distance (d) defined by said offset section of said one sheet being equal to the thickness (t) of the other said sheet, said sheets being overlapped and welded together along said offset section such that inner surfaces of the two sheets thus joined lie substantially in a common plane with no or substantially no weld material lying inwardly of said common plane whereby said steel side wall construction is capable of presenting a substantially smooth interior surface to a cargo being carried in a boxcar employing said side wall construction.

2. The side wall construction of claim 1 wherein said side sheets comprise an upper and a lower side sheet joined by said lap joint configuration, the latter extending horizontally i.e. parallel to the lengthwise dimension of a boxcar when installed thereon.

3. The side wall construction of claim 1 wherein said offset section is formed by a double bend adjacent to but spaced from said edge of said one sheet with a groove extending along said inner surfaces of the sheets and being defined between the double bend and an edge portion of said other of the sheets, and weld material being located in and along said groove and securing the two sheets together along said groove.

4. The side wall construction of claim 3 wherein the sheets of said pair are further joined together by a fillet weld extending along said edge of said one sheet and connecting said edge to an outer surface of said other sheet.

5. The side wall construction of claim 4 further including side posts secured in spaced parallel relation to each other by welding to outer surfaces of said sheets to stiffen the latter, said posts each having an offset portion therein to accommodate said offset section in said one sheet.

6. The side wall construction of claim 3 wherein said one sheet is an upper side sheet and said other sheet is a lower side sheet with said upper and lower side sheets being joined by said lap joint configuration, the latter extending parallel to the lengthwise dimension of a boxcar when installed thereon.

7. The side wall construction of claim 4 wherein said one sheet is an upper side sheet and said other sheet is a lower side sheet with said upper and lower side sheets being joined by said lap joint configuration, the latter extending parallel to the lengthwise dimension of a boxcar when installed thereon.

8. The side wall construction of claim 5 wherein said one sheet is an upper side sheet and said other sheet is a lower side sheet with said upper and lower side sheets being joined by said lap joint configuration, the latter extending parallel to the lengthwise dimension of a boxcar when installed thereon.

* * * * *